United States Patent [19]

Hannibal

[11] 4,194,372
[45] Mar. 25, 1980

[54] FLEXIBLE DRIVE COUPLING

[75] Inventor: Alan J. Hannibal, Fairview, Pa.

[73] Assignee: Lord Corporation, Erie, Pa.

[21] Appl. No.: 973,474

[22] Filed: Dec. 26, 1978

[51] Int. Cl.² .............................................. F16D 3/64
[52] U.S. Cl. ................................ 64/11 R; 64/27 NM
[58] Field of Search ............. 64/11 R, 13, 15 C, 15 B, 64/27 S, 27 NM

[56] References Cited

U.S. PATENT DOCUMENTS

| | | | |
|---|---|---|---|
| 1,868,818 | 7/1932 | Eksergian | 64/11 R |
| 2,068,279 | 1/1937 | Piron | 64/11 R |
| 2,187,706 | 1/1940 | Julien | 64/11 R |
| 2,760,359 | 8/1956 | Wildhaber | 64/11 R |
| 2,788,650 | 4/1957 | Hagenlocher et al. | 64/11 R |
| 2,995,907 | 8/1961 | Orain | 64/11 R |
| 3,071,850 | 1/1963 | Haushalter | 64/11 R |

FOREIGN PATENT DOCUMENTS

| | | | |
|---|---|---|---|
| 841984 | 6/1939 | France | 64/11 R |
| 972890 | 10/1964 | United Kingdom | 64/11 R |

Primary Examiner—Ira S. Lazarus
Attorney, Agent, or Firm—Maurice R. Salada

[57] ABSTRACT

A flexible drive coupling for innerconnecting a pair of rotatable shafts includes a hub and an outer member. The outer member has formed in it a central opening and is disposed so as to circumscribe the hub and to be generally concentric with the central axis of the hub. Secured to and disposed between the hub and the outer member is a flexing section. The flexing section includes a plurality of helically wound, radially alternating layers of a resilient material and a substantially inextensible material. The layers of the flexing section, when viewed in section taken transversely through the layers and generally parallel to the central axis of the hub, have widths that diminish with increasing radial distance from the hub. The widths of successive resilient layers, however, diminish with increasing radial distance from the hub at a faster rate than the widths of successive and intervening inextensible layers. As a result, the strains experienced by the resilient layers are more uniformly distributed throughout the layers and the coupling has an increased capablility for permitting angular misalignment between the shafts joined by the coupling.

7 Claims, 6 Drawing Figures

PRIOR ART

FLEXIBLE DRIVE COUPLING

BACKGROUND OF THE INVENTION

In any situation where power or torque is transmitted from one rotatable shaft to another, the shafts should ideally be in precise alignment. Proper alignment of the shafts reduces the performance requirements imposed on the coupling mechanism and optimizes the operation of the shafts and the machinery to which each shaft is connected. Although the two shafts may be precisely aligned when first installed, it is practically impossible to maintain such an alignment. This is particularly true when the shafts are incorporated in a moving structure such as a motor vehicle or an aircraft. Flexing of the body of the motor vehicle or aircraft may cause the mounting points or journals for the shafts to move relative to one another. Vibrations due to mass imbalances may cause the shafts to move out of alignment, just as may wearing of the journal bearings for the shafts and wearing of the shafts themselves. In many installations, therefore, the coupling or joint that connects the two shafts must be constructed to accommodate significant angular misalignments of the shafts.

A Hooke's or cardan type joint or coupling will permit the transmission of torque or power from one rotatable shaft to another despite angular misalignment of the shafts. Nonetheless, as larger and more powerful engines have been developed to turn shafts at higher rotational speeds, the loads to which shafts may be subjected at start up of an engine or during operation, due to variations in rotational speed, have substantially increased. To protect drive shafts and the connections between shafts against such shock and vibration loads, many universal couplings of the Hooke's type incorporate resilient bushings. Thus, as is shown in Moulton et al U.S. Pat. No. 2,975,621, a Hooke's type coupling may include a four armed spider with an annular bushing of elastomeric material encircling each arm of the spider. Each pair of opposed arms of the spider is connected to a different shaft.

One disadvantage of a Hooke's type coupling is that the coupling itself has essentially no capability for permitting relative axial movement between two shafts (i.e., relative movement between the shafts along or parallel to a common axis). To provide for accommodation of relative axial movements between two shafts joined by a coupling, while also providing torsional resilience and protection against shock and vibration loads, a different type of coupling may be employed. In such a coupling, a central hub is joined to a rigid outer ring by a ring-like mass of elastomer. The elastomer is bonded at least to the outer circumference of the hub, and preferably also to the inner circumferential surface of the outer ring. The hub of the coupling is connected to one shaft, while the outer ring of the coupling is joined to the second shaft. Power or torque is transmitted from one shaft to the other through torsional stressing of the elastomer in the coupling. When sufficient clearance is provided between the adjacent ends of the two shafts being joined by the coupling, relative axial movements between the shafts can be accommodated through shearing deflection of the elastomer in the coupling. The elastomer may also be deflected to permit angular misalignment between the shafts. A basic form of such a flexible or elastomeric ring type coupling, in which the hub and the outer ring are both cylindrical in shape, is illustrated in FIG. 5 of Sampson U.S. Pat. No. 2,154,077.

Although an elastomeric ring type coupling can accommodate relative axial movements between two shafts that are joined by the coupling, the motion accommodation capability can pose additional problems. For example, in order for a coupling to be able to accommodate relative axial movement, there must be sufficient clearance between the adjacent ends of the shafts. There must also be a radial thickness of elastomer large enough to permit the elastomer to be deflected in shear a distance far enough to accommodate the maximum relative axial movement that is expected between the shafts. Unfortunately, in providing a sufficient radial thickness of elastomer to accommodate the expected axial movement between the shafts, the drive coupling may be rendered unacceptably soft in the radial direction. In other words, the hub, as well as the shaft joined to the hub, may be moveable too easily in radial directions relative to the outer ring and to the shaft attached to the outer ring. To overcome unacceptable radial softness of an elastomeric ring type coupling, while still providing the necessary capability to permit axial movement, one or more concentric rings or shims of substantially inextensible material may be embedded in the elastomer at various radial distances from the hub. The addition of the rings or shims will reduce the ability of the elastomer to bulge in response to radial loads and thereby decrease the deflection of which the elastomer is capable in response to any given radial load. At the same time, the ability of the elastomer to deflect in shear under a given load along the longitudinal axis of the coupling, and thus the ability of the coupling to accommodate relative axial movements between the two shafts that it is connecting, will be substantially unaffected. A basic laminated ring type coupling such as has just been discussed is described and illustrated in Julien U.S. Pat. No. 2,187,706. A similar drive coupling is described and illustrated in Swiss Pat. No. 216,216, while Wilhaber U.S. Pat. No. 2,760,359 describes and illustrates a Hooke's type coupling with laminated elastomeric bushings.

As previously mentioned, an elastomeric ring type coupling can accommodate angular misalignment, as well as relative axial movements, between two shafts that are joined by the coupling. To permit angular misalignments, the hub of the coupling must cock or tilt with respect to the outer ring of the coupling about an axis that is generally perpendicular to the longitudinal axis of the coupling. If the hub and the outer ring are both cylindrical in shape, such a cocking or tilting motion between the hub and the outer ring can only be permitted through compression loading of at least a portion of the elastomer. Loading the elastomer in compression will tend to impose some limitations on the degree of angular misalignment that can be accommodated and will also produce a relatively high cocking stiffness for the coupling. If, however, the outer circumferential surface of the hub of such a ring-type coupling, together with the inner circumferential surface of the outer ring of such a coupling, is shaped as a portion of a sphere, angular misalignment between the shafts joined by the coupling will cause the elastomer in the coupling to be stressed primarily in shear. Because an elastomer is naturally at least three times as stiff in compression as it is in shear, the change to a spherical configuration for the outer surface of the hub and the inner surface of the outer ring will reduce the cocking stiffness of the coupling and make it easier for the coupling to accommodate larger angular misalignments between the shafts that are connected by the coupling. Examples of elastomeric ring type couplings in which the outer surface of the hub is spherical in configuration are shown in FIGS. 2, 3, 6, and 7 of the previously mentioned patent to Sampson. An elastomeric ring type coupling in which both the outer surface of the hub element and the inner surface of the outer ring element are generally spherical in configuration is described and illustrated in Julien U.S. Pat. No. 2,312,470.

To provide both a high radial stiffness and a relatively low cocking stiffness in an elastomeric ring type coupling, the coupling can be fabricated with both shims and spherically shaped surfaces. Such a coupling is described and illustrated in Eksergian U.S. Pat. No. 1,868,818. The Eksergian coupling will readily permit angular misalignment between the shafts that it is interconnecting, will have a relatively high radial stiffness, and will accommodate some relative axial movement between the shafts. (The axial motion accommodation afforded by the Eksergian coupling will not, however, be as large as the motion accommodation afforded by a coupling in which the surfaces of the rigid and/or inextensible components are cylindrical). Nonetheless, because power or torque is transmitted through a ring type elastomeric coupling by placing torsional shear loads on the elastomer of the coupling, there are limitations on the amount of power or torque that can be transmitted through the coupling. To retain many of the advantages of a drive coupling such as that shown in the Eksergian patent, while also affording higher power or torque transmission capabilities, there have been developed spirally wound elastomeric couplings such as those described and illustrated in Orain U.S. Pat. No. 2,995,907.

In the elastomeric couplings of the Orain patent, the shims or laminations of inextensible material are not disposed in a concentric array between the hub and the outer ring of each coupling. Instead, the inextensible laminations are formed as long straps that are each attached at one end to the hub and are helically wound about the hub in an open spiral. The outer end of each strap is attached to the outer ring of the coupling. The elastomer or other resilient material of the coupling is interposed between the windings of the inextensible straps or laminations. The result is a drive coupling in which power or torque is transmitted through tension loads on the inextensible material of the straps or laminations and through compression loads on the elastomer interposed between successive turns or windings of the inextensible laminations. The flexing portion or section of such a spirally or helically wound drive coupling may be shaped or fabricated in much the same manner as the flexing portion of an elastomeric ring type coupling that incorporates concentric shims or laminations. Thus, as illustrated in FIGS. 1 and 3 of the Orain patent, the outer surface of the hub, the inner surface of the outer ring, and the surfaces of the spirally wound, inextensible laminations of a spirally wound coupling may all be formed with spherical configurations to provide relatively soft deflection capability through relatively large angles in response to angular misalignments of the shafts connected by the coupling.

The use of spherical shaped inextensible elements in a drive coupling that incorporates a helically wound laminated flexing section poses severe manufacturing problems. Thus, for example, it is both difficult and expensive to fabricate a long shim or strap of an inextensible material, such as a metal, in a manner such that the strap can both be wound up in a spiral and simultaneously provide an arcuate surface across its width. It is far easier and less expensive to fabricate a helically wound flexible coupling in which the surfaces of the hub, of the outer ring, and of the inextensible laminations are all cylindrical, as illustrated in FIG. 13 of the Orain patent. To have the benefits of an easier and less expensive manufacturing process, while still providing an acceptable angular misalignment capability for a helically wound coupling, it is possible to taper the widths of the laminations of inextensible and elastomeric material in the flexing section of such a coupling with increasing radial distance from the hub of the coupling. In other words, the distance between opposite sides of the flexing section, as measured in a direction parallel to the longitudinal axis of the hub and of the coupling, will progressively diminish with increasing radial distance away from the hub, as is also shown in FIG. 13 of the Orain patent. Such a coupling construction will provide increased angular misalignment capability, as compared to a similar coupling in which the widths of the laminations are not tapered, without resorting to spherically shaped surfaces. Increasing the degree of taper will increase the angular misalignment capability and decrease the cocking stiffness of the coupling and can be continued up to the point where the stresses in the inextensible laminations become unacceptably high.

SUMMARY OF THE INVENTION

The present invention is directed to a flexible drive coupling for interconnecting two rotatable shafts. The coupling comprises a hub and an outer member. The outer member has formed in it a central opening and is disposed so as to circumscribe the hub and to be generally concentric with the central longitudinal axis of the hub. An inner circumferential surface of the outer member is presented to and is spaced radially from the outer circumferential surface of the hub. Interconnecting the hub and the outer member and disposed between and in contact with the outer surface of the hub and the inner surface of the outer member is a flexing section. The flexing section has formed in it a central opening and includes a plurality of helically wound, radially alternating and juxtaposed layers of a resilient material and of a substantially inextensible material. When viewed in section taken transversely through the layers and generally parallel to the central longitudinal axis of the hub, the layers of resilient and inextensible material have widths that diminish with increasing radial distance from the hub. Unlike prior art drive couplings, however, the widths of successive layers of resilient material diminish with increasing radial distance from the hub at a faster rate than the widths of successive and intervening layers of inextensible material. Stated another way, the flexing section of the coupling of the present invention has what may be regarded as a "double taper" with increasing radial distance from the hub. The resilient portions of the flexing section taper, or diminish in width, at one rate, while the inextensible portions of the flexing section taper, or diminish in width, at a different and slower rate with increasing radial distance from the hub.

Both in the coupling of the invention and in a similar coupling with a flexing section in which the resilient and inextensible layers taper in width at the same rate, the width of any inextensible layer at any given radial distance from the center of the coupling must be at least equal to a minimum width that is determined by the torque to be transmitted and by the maximum level of stress that is considered to be acceptable within the inextensible layer. In the past, the widths of the layers of resilient material have been made equal or intermediate to the widths of immediately adjacent layers of inextensible material. According to the present invention, however, it has been discovered that the widths of the layers of resilient material need not conform to the minimum width requirements imposed on the layers of inextensible material. Thus, as compared to a similar coupling in which the resilient and inextensible layers taper in width at the same rate, the coupling of the invention incorporates narrower layers of resilient material and requires a smaller volume of resilient material. The reduction in the amount of resilient material has only a relatively small effect on the stresses in the layers of inextensible material in the coupling and does not increase the overall maximum torque-induced strain experienced by the resilient layers in the coupling. The strain experienced by the resilient material is actually made more uniform throughout the coupling. The reduction in the amount of resilient material in the coupling of the invention also affords a reduction, albeit relatively small, in the cost of the coupling as compared to a similar coupling without a "double tapered" flexing section. In addition, the coupling of the invention permits more angular misalignment between the shafts joined by the coupling and appears to be less stiff in response to angular misalignments of the shafts. The increased angular misalignment accomodation capability and the reduced cocking or angular misalignment stiffness represent additional versatility for the coupling without the need to resort to the more expensive and difficult to fabricate spherically shaped elements of a coupling such as that shown in FIGS. 1 and 3 of the previously mentioned Orain U.S. Pat. No. 2,995,907.

In a preferred embodiment of the invention, each of the layers of the flexing section of the coupling, when viewed in section taken transversely through the layer and generally parallel to the central axis of the hub, is flat, rather than curved. The hub, the flexing section, and the outer member are all preferably of circular shape when viewed in section taken generally normal to the longitudinal axis of the hub. As with other couplings that have spirally wound flexing sections, the coupling of the invention will function best when the flexing section is radially precompressed between the hub and the outer member.

BRIEF DESCRIPTION OF THE DRAWINGS

For a better understanding of the invention, reference may be made to the following description of an exemplary embodiment, taken in conjunction with the Figures of the accompanying drawings, in which.

DESCRIPTION OF AN EMBODIMENT

Figure 1:
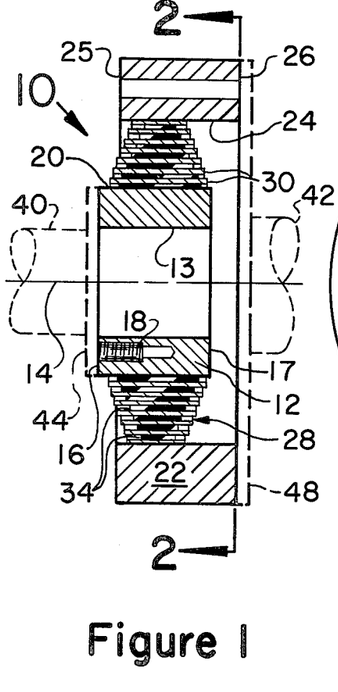
FIG. 1 is a side, sectioned view of a coupling according to the present invention, taken along line 1—1 of FIG. 2.

FIG. 1 of the drawings illustrates a resilient drive coupling 10 suitable for interconnecting a pair of rotatable shafts. The coupling 10 includes a substantially rigid or inflexible hub 12 that is formed of a substantially inextensible material, such as steel. (The rigidity of the hub 12 and other elements of the coupling 10, as well as the inextensibility of the material from which such components are fabricated, is to be judged in comparison to the characteristics of the resilient material used in the coupling.) The hub 12 is annular with a central opening 13, and it circumscribes a central longitudinal axis 14 that is also the central axis for the coupling 10. The opposite ends of the hub 12 are defined by flat, radially extending surfaces 16 and 17, respectively. Circumferentially spaced apart around the end surface 16, which is disposed to the left as viewed in FIG. 1, are four threaded bores 18. Each bore 18 extends into the surface 16 generally parallel to the axis 14 but only partway through the hub 12. The bores 18 are used to attach the hub 12 to a shaft, as will be described hereinafter.

The hub 12 has an outer circumferential surface 20 that is cylindrical in shape and circumscribes the longitudinal axis 14 of the hub. Encircling the hub 12 and spaced from its outer surface 20 is an annular outer member 22. The outer member 22, like the hub 12, is substantially rigid or inflexible and is fabricated of a substantially inextensible material, such as steel. The member 22, which has an inner circumferential surface 24 and annular, flat end surfaces 25 and 26, is also disposed so as to be generally concentric with the central axis 14 of the hub. The radially inner circumferential surface 24 of the outer member 22 is cylindrical in configuration and is presented to, but spaced radially from, the outer surface 20 of the hub 12. Circumferentially spaced apart about the outer member 22 are eight unthreaded bores 27 that are oriented generally parallel to the axis 14 and extended entirely through the outer member 22. Like the bores 18 in the hub 12, the bores 27 are used to attach the outer member 22 to a shaft, as will be described hereinafter.

Figure 2:
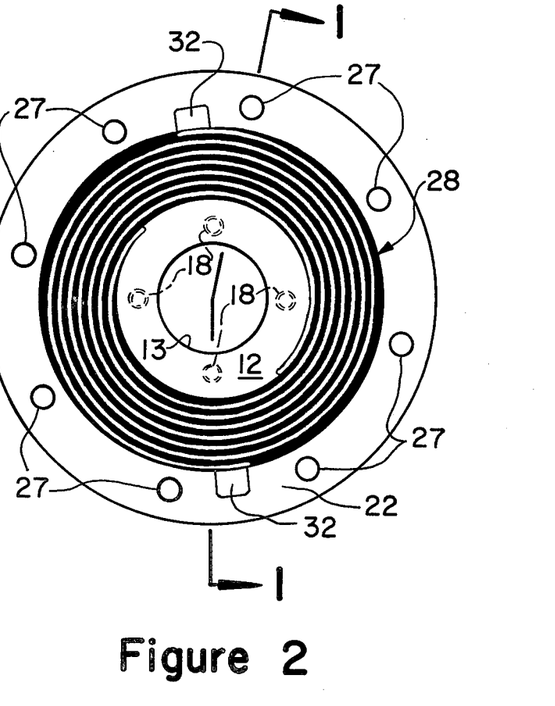
FIG. 2 is an end view of the coupling of FIG. 1, taken along line 2—2 of FIG. 1.

Disposed between the outer circumferential surface 20 of the hub 12 and the inner circumferential surface 24 of the outer member 22 is an annular flexing element or section 28. The flexing section 28 includes a pair of straps or strips 30 that are each fabricated of a relatively inextensible, yet flexible material, such as a metal or a fiber reinforced plastic. The strips 30 are helically wound about each other in loose, radially spaced apart turns or coils. The two strips 30 thus alternate with one another in a radial direction across the flexing section 28. As best shown in FIG. 2, each strip is attached at one end, by brazing, welding, or any other attachment mechanism, to the hub 12. At its other end, each inextensible strip 30 has attached to it an enlarged key 32. The key 32 is received in a slot or keyway in the inner circumferential surface 24 of the outer member 22. To hold each key 32 in place, the flexing section 28 may be precompressed between the hub 12 and the outer member 22, as described below, or else the key may be brazed or bonded, for example, within its corresponding slot or keyway.

The spaces between adjacent coils or turns of the two strips 30 of inextensible material are filled with a resilient material 34, which is preferably an elastomer, either natural rubber or a synthetic elastomer. The resilient material 34 thus appears as strips or layers that alternate with the strips or layers 30 of inextensible material in a radial direction between the hub 12 and the outer member 22. Bonding the resilient material 34 to adjacent surfaces of the inextensible strips 30 produces an integral flexing section 28. As shown in FIGS. 1 and 2, the flexing section 28 is in intimate contact with the outer circumferential surface 20 of the hub 12 and with the inner circumferential surface 24 of the outer member 22. The intimate contact may be insured by forming the flexing section 28 slightly oversize with respect to the annular space between the hub 12 and the outer member 22 and then compressing the flexing section in a radial direction to fit into the available space. The flexing section is secured to both the hub 12 and the outer member 22 through the attachments between the ends of the strips 30, on the one hand, and the hub and the outer member, on the other hand. The resilient material 34 that is juxtaposed with the hub 12 and the outer member 22 may also be bonded to the hub and the outer member.

A number of different methods are available to fabricate the coupling 10 as described above. One method is to preform the strips 30 of inextensible material as spiraled, spring-like members. The inextensible strips 30 are properly positioned between and fastened to the hub 12 and the outer member 22 and the complete assembly of the hub, the outer member, and the strips is placed in a mold. Elastomer or other resilient material 34 is then transferred under heat and pressure into the mold between the coils of the inextensible strips 30. The manufacturing method just described, however, presents serious problems in terms of maintaining the coils of the strips 30 of inextensible material in proper radial spacing and alignment. A preferred method of manufacture, therefore, is to fasten each of two strips 30 of inextensible material at one end to the hub 12. Along one side surface of each strip 30 of inextensible material, there is juxtaposed a strip of calendered elastomer, for example. The thickness of the calendered elastomeric material 34 is such that the required spacing between the coils of the inextensible strips 30 will be attained and maintained during fabrication. The strips of elastomeric or other resilient material 34 should preferably be placed on the side surfaces of the strips 30 of inextensible material which are presented away from the hub 12, in order to avoid buckling of the strips as they are wound up together. The hub 12 is mounted on a rotatable fixture, such as a slowly turning lathe, and the strips 30 of inextensible material and the strips of resilient material 34 are wound about the hub. The strips of material should be wound tightly, either by applying tension to the strips or by applying a radial load through a roller or similar mechanism. The tight winding of the strips will precompress the strips of elastomer or other resilient material 34 between the strips 30 of inextensible material. To permit the precompression to be maintained when the outer member 22 is slipped over the tightly wound strips of inextensible and resilient material, the thickness of the strips of resilient material 34 should be selected such that without precompression, the strips of inextensible material 30 and the strips of resilient material 34 would form a flexing section 28 of somewhat larger outer diameter than the inner diameter of the outer member 22. When the outer member 22 is positioned around the flexing section 28 and the hub 12, the assembled coupling is placed in a mold for vulcanization to secure the elastomer or other resilient material 34 to adjacent surfaces of the inextensible strips 30, the hub, and the outer member.

When the coupling 10 is completely assembled, it may be attached to a pair of axially aligned rotatable shafts 40 and 42 (shown in phantom in FIG. 1). The shaft 40, which extends away from the coupling 10 to the left, as viewed in FIG. 1, carries on its right-hand end a radially extending flange 44 (shown in phantom). The flange 44 is juxtaposed with the radially extending, left-hand end face 16 of the hub 12 and has formed in it unthreaded bores (not shown) that are circumferentially spaced apart around the flange so as to be aligned with the threaded bores 18 in the hub. A lag bolt or screw (not shown) is inserted into each bore in the flange 44 and is screwed into the aligned bore 16 to secure the shaft 40 to the hub 12. The second shaft 42 is secured to the outer member 22 of the coupling 10 in much the same manner as the shaft 40 is secured to the hub 12. A radially extending flange 48 (shown in phantom) is carried on the left-hand end of the shaft 42, the major portion of which extends away from the coupling 10 to the right, as viewed in FIG. 1. Unthreaded bores (not shown) that are circumferentially spaced apart around the flange 48 are aligned with the bores 27 in the outer member 22. Each bore 27, and the aligned bore in the flange 48 of the shaft 42, receives a bolt (not shown) to secure the outer member 22 to the shaft 42. As it may be desirable to use the coupling 10 in combination with a second coupling, either of the shafts 40 and 42 may be just a short stub shaft that is attached to a second coupling 10 in a similar manner as that just described.

In operation of the drive coupling 10, torque or power may be applied to the shaft 40 attached to the hub 12 so as to rotate the hub in a clockwise direction, as viewed in FIG. 2. The torque applied to the hub 12 will cause a tension load to be applied to each of the strips 30 of inextensible material connecting the hub to the outer member 22 and will also tend to cause the strips 30 to wind up slightly more tightly about the hub. The tensions loads on the strips 30 of inextensible material will cause the outer member 22 and its attached shaft 42 to be pulled into a clockwise rotation with the hub 12. As should be apparent, stress will be applied to the strips 30 of inextensible material as a result of the tension loads exerted on the strips. In addition, as each strip 30 tries to wind up more tightly about the hub 12, compression loads are applied to the layers of resilient material 34 disposed between adjacent coils of the strips 30. Thus, stress will also be applied to the strips 30 of inextensible material as a result of the transfer of loads from one turn or coil of each inextensible strip through a layer of resilient material 34 to an adjacent, radially inwardly located turn or coil of an inextensible strip. The resilient material 34 will be subjected both to compression loads applied by the windings or coils of the strips 30 of inextensible material and to shear loads that result from relative circumferential movement between adjacent windings or coils of the strips 30 of inextensible material. The compression stresses imposed on and the compression strains experienced by the resilient material 34 are more significant, however, than the shear stresses and strains experienced by the material. The resilient material 34 effectively resists through compression loading the tendency of the strips 30 of inextensible material to wind themselves up completely on the hub 12 in response to tension loads.

In addition to its ability to transmit power or torque from one shaft 40 to the other 42, the coupling 10 can accommodate relative axial movement between the shafts. If, for example, the shaft 40 moves to the right, as viewed in FIG. 1, toward the shaft 42, the layers of resilient material 34 will deflect in shear to permit relative parallel movement between the various inextensible components of the coupling 10, including adjacent coils of the inextensible strips 30. The coupling 10 will thus deflect into a conical or dished shape and permit movement of the shaft 40 up to the point where the right-hand end surface 17 of the hub 12 contacts the flange 48 of the shaft 42 or the shaft 42 itself.

The coupling 10 will accommodate angular misalignment between the shafts 40 and 42 joined by the coupling through deflection in tension and compression of the resilient or elastomeric material 34. If, for example, the shaft 40 connected to the hub 12 becomes angularly misaligned with respect to the shaft 42 connected to the outer member 22 of the coupling 10, the left-hand end of the shaft 40, as viewed in FIG. 1, might be seen, at any particular instant in time, as being tilted or cocked downwardly in FIG. 1. The downward tilting or cocking of the shaft 40 will tend to produce a corresponding downward tilting or cocking motion of the left-hand end of the hub 12 relative to the outer member 22 of the coupling 10 about an axis perpendicular to the central longitudinal axis 14. Tilting or cocking of the hub 12 with respect to the outer member 22 will cause adjacent coils or windings of the strips 30 of inextensible material to move away from each other along the edges of the strips which are in the top half of FIG. 1 and which correspond to the end surfaces 16 and 25 of the hub and the outer member, respectively. The movement of the edges of the strips 30 away from each other will cause the corresponding edges of the layers of resilient material 34 to be placed in tension between adjacent coils of the strips 30 and between the strips 30 and the hub 12 and outer member 22. The edges of the strips 30 in the top half of FIG. 1 which correspond to the end surfaces 17 and 26 of the hub 12 and the outer member 22, however, will tend to move toward each other. The movement of the edges of the strips 30 toward each other will cause the corresponding edges of the layers of resilient material 34 to be compressed both between adjacent coils or windings of the strips 30 and between the strips 30 and the hub 12 and outer member 22. The resilient material 34 will thus be deflected in compression and in tension to permit some cocking movement of the hub 12, but will also offer a resistance to such cocking motion which will increase with increasing deflection and motion. A similar, but reversed, compression and tension loading and deflection will be experienced by the resilient material 34 in the lower half of FIG. 1 to permitting cocking of the hub 12. In other words, it is the edges of the layers of resilient material 34 corresponding to the end surfaces 16 and 25 of the hub 12 and the outer member 22, respectively, which will be compressed in the lower half of FIG. 1.

As previously discussed, the ability of a coupling such as that illustrated in FIG. 1 to accommodate angular misalignment of two shafts joined by the coupling is determined by the widths of adjacent layers or adjacent windings of inextensible material in the coupling. More specifically, when viewed in section taken across the strips 30 and generally parallel to the axis 14, the strips 30 of inextensible material are substantially flat. Angular misalignment of the shafts 40 and 42 will thus produce compression loading of the resilient material 34 in the coupling 10, rather than merely shear loading, as would be the case if the strips 30 were spherical in section, for example. Consequently, in order to reduce the degree of compression loading of the resilient material 34 for any given angle of angular misalignment of the shafts 40 and 42, and thereby to decrease the cocking stiffness of the coupling 10 and to increase the total angular misalignment that the coupling 10 can accommodate, the widths of the strips 30 of inextensible material, as well as the widths of the intervening layers of resilient material, are reduced with increasing radial distance from the hub 12. The widths of the strips 30 and the layers of elastomeric material 34 are measured generally parallel to the axis 14.

Figure 3:
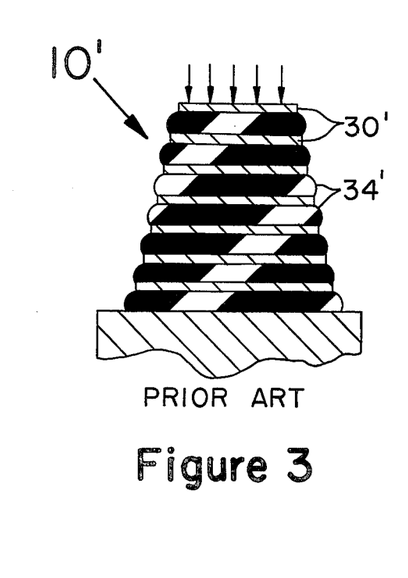
FIG. 3 is a sectional view, on an enlarged scale, corresponding to a portion of the view shown in FIG. 1, but taken of a prior art coupling.

Prior art couplings, such as the coupling illustrated in FIG. 13 of Orain U.S. Pat. No. 2,995,907, have incorporated layers or strips of resilient and inextensible material that progressively decrease in width with increasing radial distances from the hubs of the couplings. The widths of the layers or strips of resilient and inextensible material typically diminish at the same rate so as to produce a uniformly tapered flexing section for the coupling, as illustrated in FIG. 3 of the application drawings. (In FIG. 3, elements of the prior art coupling 10' which correspond to elements of the coupling 10 are designated with similar, but primed reference numerals.) The ability to reduce the widths of the successive layers of inextensible and resilient material is limited, however, by the tension loads imposed on the inextensible material. In order to transmit a given amount of torque or power between the hub and the outer member of a coupling, each strip of inextensible material in the coupling must have, at any given radial distance from the center of the coupling, a minimum cross sectional area sufficient to carry the expected tension load to be imposed on the strip. The expected tension load at any given radial distance from the center of the coupling is directly related to the force component of torque (i.e., torque=force×radius) and thus diminishes with increasing radial distance. If the strip of inextensible material does not have the required minimum cross sectional area at any given radial distance from the center of the coupling, the load and stresses on the strip will be unacceptably high and may lead to failure of both the strip and the coupling in which the strip is incorporated.

Figure 4:
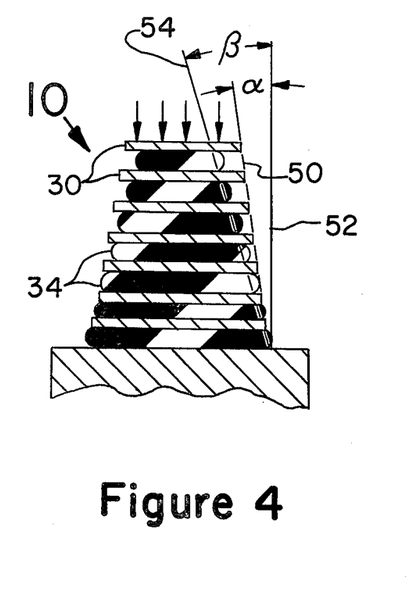
FIG. 4 is a sectional view, on an enlarged scale, corresponding to the view shown in FIG. 3, but taken of a portion of the coupling illustrated in FIGS. 1 and 2.

According to the present invention, it has been discovered that although there is a practical limitation placed on the extent to which the widths of the strips of inextensible material in a coupling may be reduced or tapered with increasing radial distance from the hub of the coupling, the tapering of the strips of resilient material need not be limited to the same extent. Thus, as is illustrated in FIG. 4, the widths of the layers or strips of resilient material 34 in the coupling 10 may be diminished with increasing radial distance from the hub 12 at a faster rate and to a greater extent than the widths of the strips 30 of inextensible material. The widths of the strips 30 of inextensible material are tapered such that a line 50 drawn through the edges of successive windings or layers forms an angle alpha ($\alpha$) with a reference line 52 oriented normal to the outer circumferential surface 20 of the hub 12. The degree of taper of the widths of the strips 30 of inextensible material, and thus the value of the angle alpha ($\alpha$), is limited and determined by the tension loads on the strips. At the same time, however, the widths of the intervening layers of resilient material 34 may be diminished or tapered with increasing radial distance from the hub 12 such that a line 54 drawn through the edges of successive layers of resilient material forms with the reference line 52 previously described an angle beta ($\beta$) that is greater than the angle alpha ($\alpha$).

The advantages of the dual or double tapering of the widths of the layers of material incorporated in the flexing section 28 of the coupling 10 include the elimination of some resilient material, as compared to the prior art coupling 10' of FIG. 3, and a consequent reduction in the cost of the coupling 10. Because there is less resilient material 34 adjacent the edges of the radially outer windings or layers of inextensible material in the flexing element 28, any given angle of misalignment between the shafts 40 and 42 joined by the coupling 10 will produce less compression loading of the resilient material, as compared to the coupling 10' of FIG. 3. As a result, more angular misalignment will be permitted between the hub 12 and the outer member 22, as compared to the coupling 10' of FIG. 3. The coupling 10 will also appear somewhat less stiff in response to angular misalignments of the shafts 40 and 42 that it connects than a similar coupling utilizing a flexing element such as that shown in FIG. 3. The reduction in cocking or angular misalignment stiffness will result in a reduction in the moments that must be resisted by the journals or supports for the shafts 40 and 42 where the angle of misalignment is constant in whole or part. In addition, as compared to the coupling 10' of FIG. 3, the torque-induced compression strains experienced by the radially outer layers of resilient material 34 in the coupling 10 will be more nearly equal to the torque-induced compression strains experienced by the radially inner layers of resilient material. The elimination of resilient material 34 from the radially outer layers does not adversely affect the strains in the material, but actually causes the resilient material in the radially outer layers to be worked to a greater extent than with the coupling construction shown in FIG. 3. The coupling 10 will, however, probably require a greater degree of radial precompression and may result in slightly higher stresses in the strips 30 of inextensible material, as compared to a similar coupling constructed as illustrated in FIG. 3.

To demonstrate the advantages offered by the construction of the coupling 10, a computer finite element analysis was performed on two drive couplings constructed generally as shown in FIGS. 1 and 2 of the drawings. One coupling had a flexing section tapered as shown in FIG. 3, while the other coupling incorporated a flexing section tapered as shown in FIG. 4. Each coupling that was analyzed included four (4) strips of inextensible material and four (4) strips of elastomeric material, each strip being wound two-and-one-half times around the hub. The outer circumference of the hub was at a radius of two inches (2") from the central longitudinal axis of the hub, while the inner circumferential surface of the outer member was at a radius of three and twenty-five hundredths inches (3.25") from the central axis of the hub. The strips of inextensible material were five hundredths inches (0.05") in thickness, varied in width from one and twenty-five hundredths inches (1.25") to seventy-five hundredths inches (0.75") in accordance with the formula: width=2.05"−(0.4×radius), had a tensile modulus of $3.375 \times 10^7$ pounds per square inch, and had a density of $7.38 \times 10^{-4}$ pounds per cubic inch. The strips of elastomeric material utilized in the couplings varied in width from one and twenty-five hundredths inches (1.25") to forty hundredths inches (0.40") in accordance with the formula: width=2.61"−(0.68×radius), had a shear modulus of $1.2 \times 10^2$ pounds per square inch, had a bulk modulus of $2.0 \times 10^5$ pounds per square inch, and had a density of $1.03 \times 10^{-4}$ pounds per cubic inch. The torque applied to each coupling was assumed to be $8.1 \times 10^3$ pounds, but no angular rotation was assumed. The flexing section of each coupling was assumed to be precompressed two hundredths inches (0.2") in radius for the single taper section and three hundredths inches (0.03") for the double taper section.

Figure 5:
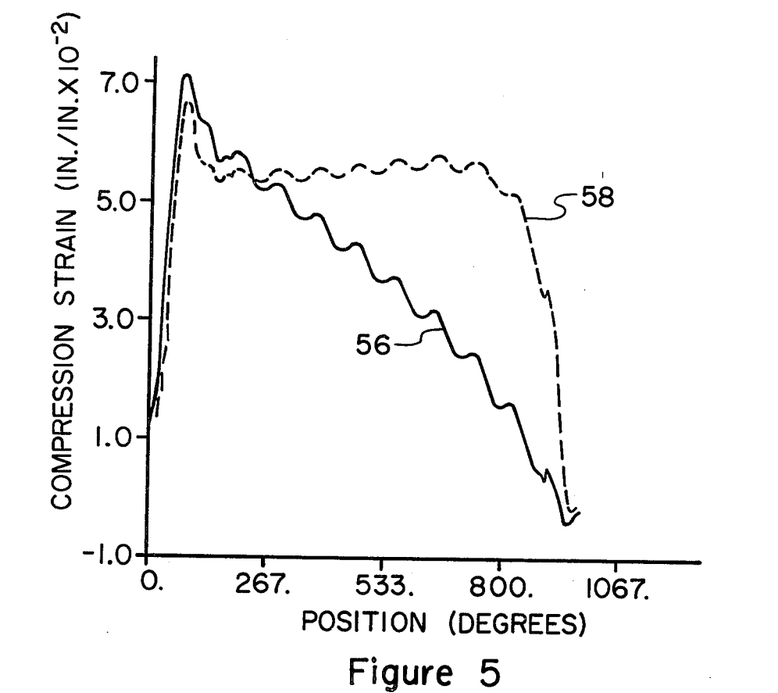
FIG. 5 is a graphical comparison of the compression strains experienced by the resilient layers of two couplings such as those shown in FIGS. 3 and 4.

FIG. 5 of the drawings is a graphical comparison of the torque-induced compression strains experienced by the elastomeric layers of the two couplings. In FIG. 5, the compression strains are plotted along the vertical axis, with negative values indicating tension loads on the elastomer. The location of each elastomeric section or increment under consideration is indicated along the horizontal axis in terms of the angular position of the increment relative to a starting position at the hub. (For the computer analysis, each strip of elastomeric material was divided into seventy-two increments.) The solid line 56 represents the compression strains experienced by the elastomeric layers in the coupling having the same rate of radial tapering for both its elastomeric layers and its inextensible layers. As can be seen, the compression strains in the elastomeric layers progressively decrease with increasing radial distance from the hub until, at the outermost portion of the flexing section, the elastomeric material experiences a slight tension load. In contrast to the coupling with the single taper flexing section, the elastomeric material in the coupling with the double taper flexing section experiences nearly uniform compression strains with increasing radial distance from the hub, as indicated by the dashed line 58. Only at the very outermost portion of the coupling does the compression strain drop sharply to about zero (0).

Figure 6:
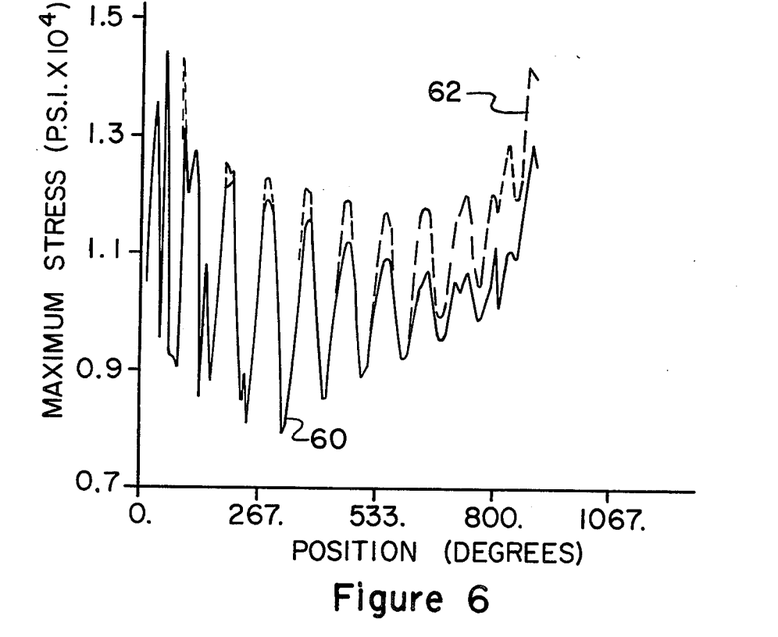
FIG. 6 is a graphical comparison of the stresses experienced by the inextensible layers of two couplings such as those shown in FIGS. 3 and 4.

FIG. 6 of the application drawings is a graphical comparison of the stresses experienced by the inextensible strips in each of the two drive couplings analyzed by the computer finite element analysis discussed above. In FIG. 6, the maximum stress in the inextensible material is plotted along the vertical axis, while the position of the increment of inextensible material being analyzed is plotted along the horizontal axis in terms of its angular position relative to the end of the inextensible strip attached to the hub. As with the resilient material analyzed to produce the results displayed in FIG. 5 of the drawings, each inextensible strip was subdivided into seventy-two increments for finite element analysis. As indicated by the solid line 60 in FIG. 6, the maximum stresses experienced in the inextensible strips of the coupling that has a single taper for both its inextensible and elastomeric layers are highest adjacent the hub and the outer member of the coupling. In the coupling that has different angles of taper for its inextensible and elastomeric layers, the maximum stresses in the inextensible strips are also highest adjacent the hub and the outer member of the coupling, as indicated by the dashed line 62 in FIG. 6. Toward the outer member of the coupling, the maximum stresses in the inextensible strips of the coupling with the double taper flexing section are slightly higher than the corresponding stresses in the other coupling. Nonetheless, although the maximum stresses in the radially outer portions of the inextensible strips of the double taper coupling are higher than the maximum stresses at the same locations in the inextensible strips of the single taper coupling, the maximum stresses are still not raised above the greatest maximum stress for the entire length of each inextensible strip, which is experienced adjacent the hub of the coupling. It should also be noted that throughout the length of each strip of inextensible material in the double taper coupling, the average stress (which is not shown in FIG. 6) experienced by the strip is only slightly higher than the corresponding average stress experienced in each inextensible strip of the single taper coupling.

As FIGS. 5 and 6 indicate, a double taper flexing section for a spirally wound elastomeric coupling offers the opportunity to eliminate elastomeric material from the coupling and to strain the remaining elastomeric material to an almost constant level throughout most of the flexing section. The only apparent penalty for the savings in the amount of elastomeric material used and for the more efficient use of the elastomeric material is a slight increase in the stresses experienced by the strips of inextensible material in the coupling. At the same time, the double tapered flexing section provides a lower cocking or tilting stiffness for a coupling, as compared to the corresponding cocking or tilting stiffness of a coupling having a single taper for its flexing section.

In the foregoing discussion of the present invention, the hub 12 and the outer member 22 of the coupling 10 have been described and illustrated as one-piece elements formed separately from the flexing section 28. Nonetheless, it would be possible to fabricate both the hub 12 and the outer member 22 from the same strips 30 of inextensible material used to fabricate the flexing section 28. Thus, for example, a strip 30 of inextensible material could first be helically wound about itself to form a hub, then wound together with a strip of resilient material to form the flexing section 28, and finally again helically wound about itself to form an outer member 22. Such a construction is described and illustrated in greater detail in Kobalter U.S. Pat. No. 3,860,134, which is directed to a flexible rocket nozzle.

It will be understood that the embodiment described above is merely exemplary and that persons skilled in the art may make many variations and modifications without departing from the spirit and scope of the invention. For example, when viewed in section taken normal to the longitudinal axis 14, the hub 12, the flexing section 28, and the outer member 22 of the coupling 10 are all circular in shape. Nonetheless, other cross-sectional configurations, such as octagonal, are possible and may be desirable. All such modifications and variations are intended to be within the scope of the invention as defined in the appended claims.

What is claimed is:
1. A flexible drive coupling comprising:
 (a) means defining a hub that has a central longitudinal axis and an outer surface that circumscribes the axis;
 (b) means defining an outer member that has formed in it a central opening and that is disposed so as to circumscribe the hub and to be generally concentric with the central axis of the hub, the outer member having a circumferential inner surface that is presented to and is spaced radially from the outer surface of the hub; and
 (c) means defining a flexing section that has formed in it a central opening, that interconnects the hub and the outer member, and that is disposed between and in contact with the outer surface of the hub and the inner surface of the outer member, the flexing section including a plurality of helically wound, radially alternating and juxtaposed layers of resilient material and of a substantially inextensible material, the layers of resilient material and inextensible material when viewed in section taken transversely through the layers and generally parallel to the central axis of the hub having widths that diminish with increasing radial distance from the hub, the widths of successive layers of resilient material diminishing with increasing radial distance from the hub at a faster rate than the widths of successive and intervening layers of inextensible material.

2. A drive coupling, according to claim 1, wherein the hub, the flexing section, and the outer member are all of circular shape when viewed in section taken generally normal to the longitudinal axis of the hub.

3. A drive coupling, according to claim 2, wherein the inner surface of the outer member and the outer surface of the hub are both cylindrical in shape, and wherein each of the layers of the flexing section is flat when viewed in section taken (a) transversely through the layers and (b) generally parallel to the central axis of the hub.

4. A drive coupling, according to claim 1, wherein the layers of the flexing section are fabricated of at least one strip of substantially inextensible material helically wound together with at least one strip of resilient material, each strip of inextensible material being secured to both the hub and the outer member.

5. A drive coupling, according to claim 1 or claim 4, wherein the resilient material is an elastomer.

6. A drive coupling, according to claim 1, claim 2, claim 3, or claim 4, wherein the flexing section is precompressed between the hub and the outer member.

7. A flexible drive coupling comprising:
 (a) means defining a substantially rigid hub that has a central longitudinal axis and a cylindrically shaped outer surface that circumscribes the axis;
 (b) means defining the annular, substantially rigid outer member that is disposed so as to circumscribe the hub and to be generally concentric with the central axis of the hub, the outer member having a circumferential inner surface that is cylindrically shaped and that is presented to and spaced radially from the outer surface of the hub; and
 (c) means defining an annular, cylindrically shaped flexing section that interconnects and is precompressed between the hub an the outer member, the flexing section being disposed between and in contact with the outer surface of the hub and the inner surface of the outer member, the flexing section including at least one strip of a substantially inextensible material helically wound together with at least one strip of an elastomeric material so as to form a plurality of radially alternating layers of elastomeric material and substantially inextensible material, juxtaposed surfaces of adjacent layers being bonded to one another, the layers of elastomeric material and inextensible material when viewed in section taken transversely through the layers and generally parallel to the central axis of the hub being flat and having widths that diminish with increasing radial distance from the hub, the widths of successive layers of elastomeric material diminishing with increasing radial distance from the hub at a faster rate than the widths of successive and intervening layers of inextensible material, each strip of inextensible material being engaged at its ends with the hub and the outer member.

* * * * *